(No Model.)  3 Sheets—Sheet 1.

B. V. NORDBERG.
VALVE GEAR.

No. 428,316.  Patented May 20, 1890.

Attest:
Sidney P. Hollingsworth
Horace A. Dodge

Inventor:
Bruno V. Nordberg
by Dodge and Sons,
Attorneys.

(No Model.) 3 Sheets—Sheet 2.

B. V. NORDBERG.
VALVE GEAR.

No. 428,316. Patented May 20, 1890.

Attest:
Sidney P. Hollingsworth
Horace A. Dodge

Inventor:
Bruno V. Nordberg
by Dodge & Sons,
Attorneys.

(No Model.)  B. V. NORDBERG.  3 Sheets—Sheet 3.
VALVE GEAR.
No. 428,316.  Patented May 20, 1890.
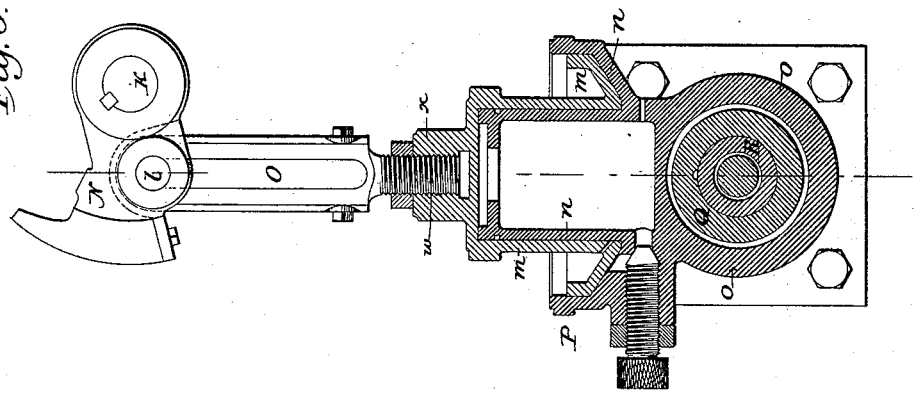
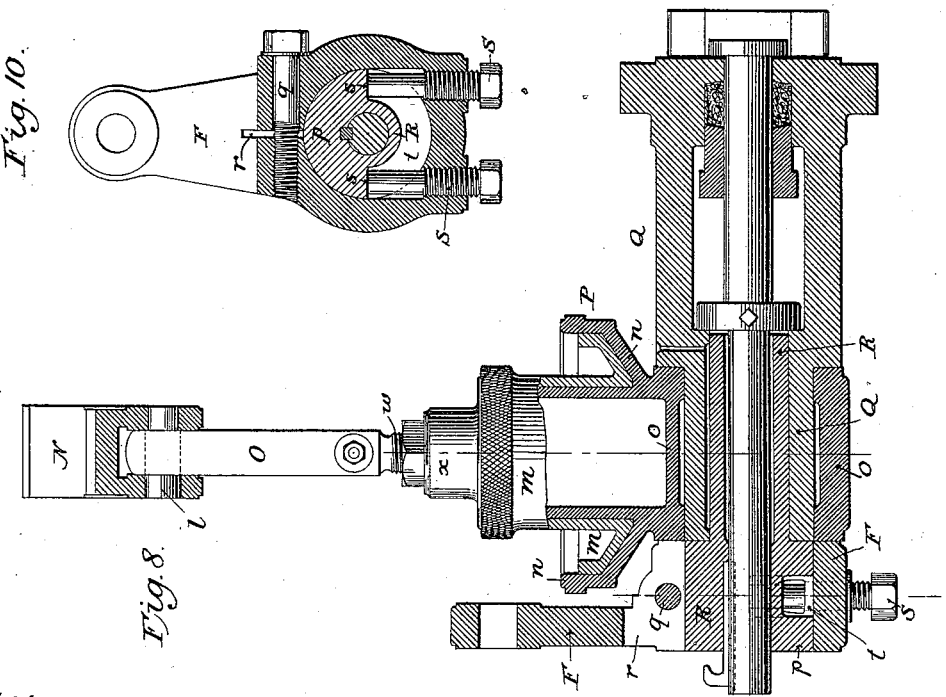
Attest:
Sidney P. Hollingsworth
Horace A. Dodge
Inventor:
Bruno V. Nordberg
by Dodge & Sons,
Attorneys.

UNITED STATES PATENT OFFICE.

BRUNO V. NORDBERG, OF MILWAUKEE, WISCONSIN.

VALVE-GEAR.

SPECIFICATION forming part of Letters Patent No. 428,316, dated May 20, 1890.

Application filed January 28, 1890. Serial No. 338,356. (No model.)

*To all whom it may concern:*

Be it known that I, BRUNO V. NORDBERG, a citizen of Finland, Russia, residing at Milwaukee, in the county of Milwaukee and State of Wisconsin, have invented certain new and useful Improvements in Valve-Gear, of which the following is a specification.

My invention relates to valve-gear for steam-engines; and it consists of various features hereinafter more fully set forth and claimed.

Figure 1:
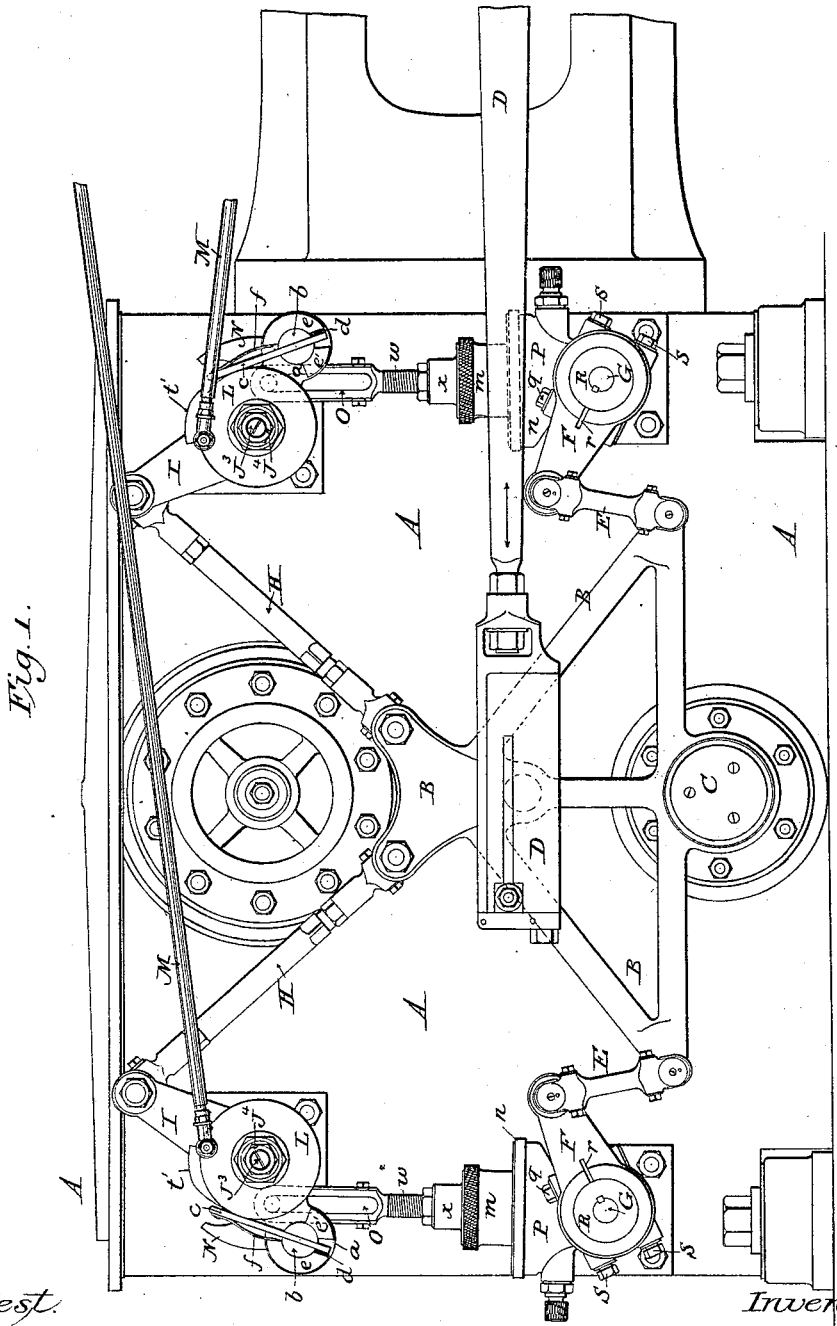
Figure 2:
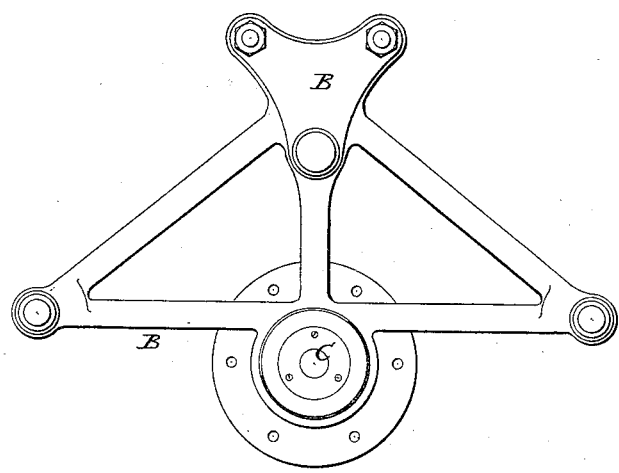
Figure 3:
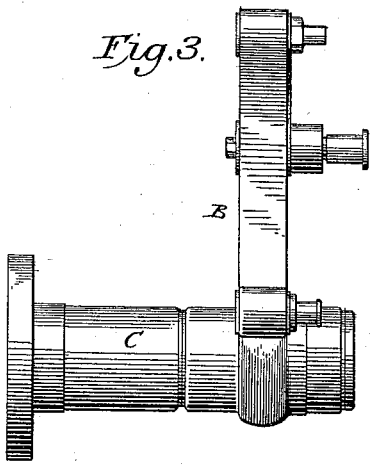
Figure 4:
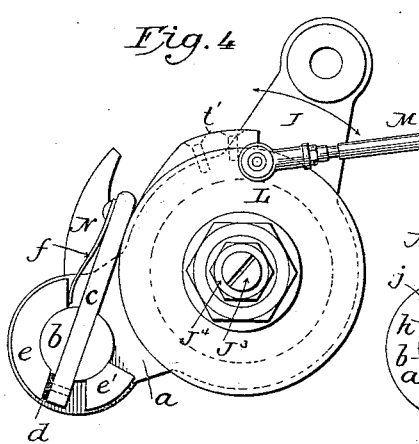
Figure 5:
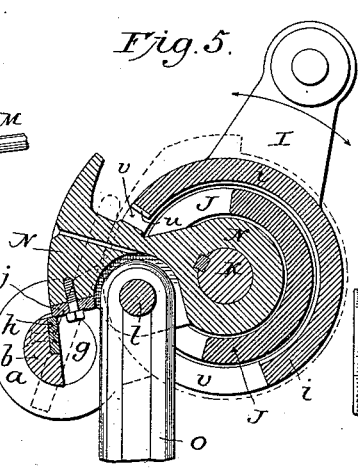
Figure 6:
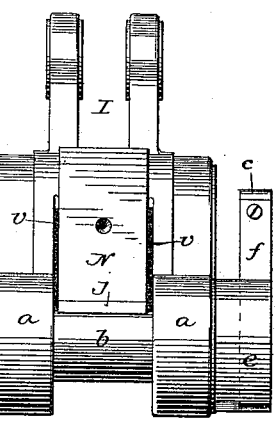
Figure 7:
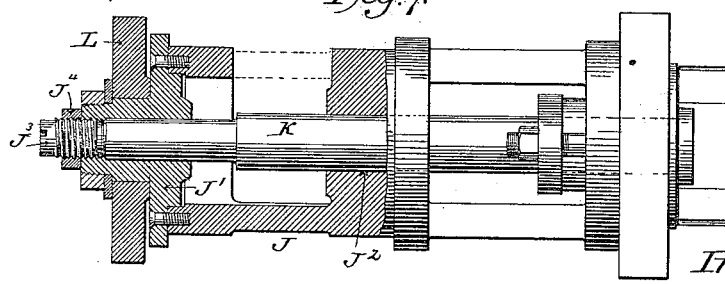

In the drawings, Figure 1 is a face view of the cylinder of a steam-engine provided with my improved mechanism; Figs. 2 and 3, respectively face and edge views of the wrist-lever; Figs. 4, 5, and 6 views illustrating the construction of the steam-valve lever and the trip; Fig. 7, a horizontal sectional view of the bonnet of the steam-valve; and Figs. 8, 9, and 10, sectional views illustrating the construction of the exhaust-valve lever, vacuum-pot, and attendant parts.

A indicates the cylinder as a whole, provided with the usual inlet and exhaust valves, and B indicates a triangular wrist-lever connected with and rocked upon its pivot C by means of the eccentric-rod D, as shown in Fig. 1. The lower corners of the wrist-lever are connected by links E with arms or levers F, secured to the stems G of the exhaust-valves. The upper end of said wrist-lever B is connected by links H with the arms or levers I, mounted loosely upon the bonnets J of the inlet-valves. The outer end of the bonnet J is closed by a cap J', which forms a bearing for the valve-stem K, as shown in Fig. 7, the said valve-stem being also supported within the bonnet, as at $J^2$.

$J^3$ indicates a set-screw carried by the cap J', and adapted to bear against the outer end of the valve-stem K, said screw being held in position by means of a nut $J^4$, as shown in Fig. 7, or in any other equivalent manner, so as to take up the thrust on the stem. Mounted upon the cap J' is a cam or eccentric cut-off plate L, connected by a rod M with the governor. (Not shown.)

Each of the arms I is provided with an extension $a$, in which is journaled a pin $b$, the said pin being provided with a bar or arm $c$, projecting above and below the same, as shown in Figs. 1, 4, and 5. The lower end of the bar, which is provided with a pad or cushion $d$, works between two lugs or shoulders $e\ e'$, which serve to limit its movement, while the upper end of the bar is held against the edge of the cut-off plate L by means of a spring $f$, as clearly shown in Figs. 1 and 4. The shoulder $e'$ may, however, be omitted, if desired. Pin $b$ is cut away between its ends, as at $g$, Fig. 5, and is provided with a bearing-plate $h$, upon which the drop-lever N is designed to rest, the said drop-lever being keyed to the valve-stem and projecting laterally through the side of the bonnet J, as clearly shown in Fig. 5. The hub $i$ of the arm or lever I is also slotted or cut away, as at $v$, in a manner similar to the bonnet in order that the drop-lever may engage the pin, the said drop-lever being also provided with a steel plate $j$, adapted to rest upon the corresponding plate $h$ of the pin $b$.

O indicates a rod having an elongated slot $k$, to receive a pin $l$, carried by the drop-lever, and having or carrying a moving part $m$ of the vacuum-pot P. The other part $n$ of the vacuum-pot is provided with a tubular hub $o$, which, as shown in Figs. 8 and 9, fits upon a reduced portion of the bonnet Q of the exhaust-valve, and is held in place thereon by the exhaust arm or lever F, so that while capable of rocking or oscillating upon the bonnet it will be prevented from working off the end thereof.

R indicates a sleeve or collar, the main body of which fits within the bonnet Q, while the head $p$, which fits an opening in the arm F made to receive it, projects beyond the end of the bonnet, as shown in Fig. 8. The sleeve is keyed or otherwise secured to the valve-stem G, and has its head $p$ clamped within the opening in the arm F by means of a bolt or screw $q$, which intersects a slot $r$ in the arm and draws or binds the arm upon the head $p$, as shown in Figs. 8 and 10.

S S indicate screws or bolts carried by the arm F, and arranged to bear at their inner ends against shoulders $s\ s$ on the head $p$ of the sleeve R, the said shoulders being in the present instance the end walls of a slot or groove $t$, extending partially around the head $p$, as in Figs. 8 and 10.

As the eccentric-rod D moves backward and forward it rocks the wrist-lever B upon its support C and, acting through the links E and E, causes the proper rocking of the exhaust-valve. As the wrist-lever thus rocks, acting through the links H H, it also rocks the levers I, as indicated by the arrow in Figs. 3 and 4, and, as the drop-lever N is resting upon the pin b of the lever I, the drop-lever will be raised, as shown in Fig. 4, and carry the movable part m of the vacuum-pot with it. Of course, as the drop-lever is keyed to the valve-stem, the steam-valve will be rocked to open the steam-port when the drop-lever is raised; but the instant the said lever N is disengaged from the pin b the lever will fall and close the valve.

When the drop-lever and the lever I move or rock, the upper end of the plate or bar c will ride over or along the cam-face t of the cut-off plate L, and, owing to the formation of this cam-face, the pin b will, through the plate or bar c, be rocked or tipped, so as to throw the steel bearing face or plate h from beneath the corresponding face or plate j of the drop-lever, thereby allowing the latter to fall, as before explained. The point at which the cam-disk or cut-off plate L will throw the upper end of the plate or bar c outward sufficiently to permit the drop-lever to fall will be varied according to the position of said plate L, as controlled by the rods M, actuated by the governor or hand lever or wheel.

If the dash-pot or vacuum-pot should fail to cause the dropping of the lever N and the closing of the valve when the pin b has been rocked sufficiently to permit the said lever to fall, the valve will be closed positively by the end wall u of slot v in the arm or lever I striking upon the upper face of the drop-lever when the lever I begins to move backward. As the rod O, connected with the movable part of the dash-pot and the drop-lever, is raised, the dash-pot as a whole will rock or oscillate upon the bonnet Q of the exhaust-valve, thereby preventing any binding as the two parts of the dash-pot move one upon the other.

The steel bearing-plates h and j are made the full width of the drop-lever, so as to form a broad bearing for the latter upon the rocking pin. The drop-lever is mounted centrally between the two arms of the lever I. The connection between the rod O and the drop-lever is in the center of the latter, and the bearings for the valve-stem are also each side of said central line, so that all the parts connected or coacting with the steam-lever I are in line with the direction of movement of the lever, or are arranged equidistant on each side of such a line. This arrangement insures a uniform wear on all the parts and prevents side play, such as would be likely to occur were the parts arranged out of line with or wholly on one side of the steam-lever.

By mounting the lever I on the bonnet of the steam-valve an extra support for the same is dispensed with.

It will be noted upon reference to Figs. 8 and 9 that the slotted rod O has a threaded stem w, which screws into a correspondingly-threaded neck x on the upper end of the movable part or plunger m of the vacuum-pot. Now, when it is desired to adjust the device, it is only necessary to turn the part m relatively to the rod O and cause the said part m to move up or down upon said rod. This construction is of considerable value, for while it possesses all the advantages due to the use of a rigid non-jointed connection between the drop-lever and the plunger, it is nevertheless capable of ready and accurate adjustment, and this, too, without throwing the axis of pin l out of line with the axis of the valve-stem. Instead of making the links E, connecting the wrist-lever and the exhaust-arms F, adjustable, I make the said arms adjustable upon the sleeve R, which latter, as before explained, and as shown in Figs. 8 and 10, is keyed to the exhaust-valve stem G. By loosening the screw or bolt q and turning one or the other of the screws S the relative positions of the arm and sleeve may be accurately varied without changing or affecting the throw of the arm, which is a matter of considerable importance in engines of this character. It is necessary in using this "wrist-motion" to bring the pin on the exhaust-lever, the pin on the wrist-lever, and the pin upon which the wrist-lever oscillates or rocks nearly to a straight line at the extreme throw or travel, in order to make the motion of the valve very slow when it is closed and moves under pressure. If, however, the motion should be such that the pins should pass this position or straight line, a double motion would be produced at the extreme position—that is, the valve edge would move to the extreme, then go back a little, go to the extreme once more, and finally move to open. This condition is easily brought about in the usual constructions of valve-gear by adjusting the connecting links or rods, and is detrimental to the durability of the valve and seat, as the double motion under pressure produces double wear. Different conditions—such as speed and load—require different setting of the exhaust-valves to insure smooth running. Ordinarily they are set with very little lap, (when valve-motion is in central position;) but under light load or high speed they have to be set with a lap of from one-fourth to one-half of an inch, and it will be apparent that if this setting is to be accomplished by the lengthening or shortening of the rod or link connecting the wrist-lever with the exhaust-lever the motion of the latter will be varied. It is to overcome these difficulties that I provide for the adjustment of the sleeve relatively to the exhaust-lever.

The knock-off bar or plate c, carried by the pin b, is prevented from bearing at its upper end against the edge of the cam-plate L, after it has permitted the drop-lever to fall, by reason of the lower end of said bar or plate c, or a pad d, secured thereto, coming into contact with the lug or shoulder e and preventing the spring f from throwing the upper end of the bar or plate c against the cam-plate.

In using the term "wrist-lever" I do not wish to be understood as limiting myself to the precise construction shown, for it is obvious that, so far as various other features of the invention are concerned, other and equivalent devices may be substituted for the wrist-lever.

The set-screw $J^3$, (shown in Fig. 7,) which presses upon the end of the valve-stem K, is designed to take the thrust on the stem. The full boiler-pressure is continually pressing the valve-stem outward, and an adjustable thrust-bearing is particularly valuable to receive or take this pressure. Usually a collar similar to that shown in Fig. 8 is employed for this purpose; but it will be seen that the end screw possesses material advantages over the collar, not only because the screw is more easily adjusted than the collar, but also because the frictional resistance when the valve is tipped is much less with the screw than with the collar.

The knock-off plate L is made circular in form, so as to render it cheap and easy of construction, its cam-face $t'$ being formed of a suitably-shaped block secured in position by screws, as shown by dotted lines in Fig. 4. So, too, by pivoting or journaling this plate on the stud projecting from the outer face of the bonnet-cap $J'$, I secure a bearing of comparatively small diameter located as far as possible from the hot parts of the bonnet.

Upon reference to Fig. 4 it will be seen that the fixed point of the spring f is farther from the center of pin b than is the free end which presses or bears against the lever I, the consequence of such arrangement being that I am enabled to use a long spring with a short throw.

Having thus described my invention, what I claim is—

1. In a valve mechanism, the combination, with the triangular oscillating or rocking wrist-lever and means for moving the same, of links H H, extending from the apex of the wrist-lever to steam-arms, and links E E, extending from the lower corners of the wrist-lever to the exhaust-arms.

2. In a valve mechanism, the combination, with a valve and its arm, of an actuating-lever, a link connecting the arm and lever, and means, substantially such as shown, for varying the lap of the valve without changing the throw of the arm.

3. In a valve mechanism, the combination, with a valve, of an arm, means for adjusting the valve relatively to the arm to vary the lap of the valve, an actuating-lever, and a non-adjustable connection between the arm and lever.

4. In a valve mechanism, the combination, with a lever, of a valve provided with a valve-stem G, a sleeve secured to the stem, an arm adjustably mounted on the sleeve, and a link connecting the arm and lever.

5. In a valve mechanism, the combination, with a lever, of a valve provided with a valve-stem G, a sleeve secured to the stem and provided with shoulders u, an arm mounted upon the sleeve, a set screw or screws carried by the arm and bearing against the shoulder, and a link connecting the arm and lever.

6. In a valve mechanism, the combination, with a cylinder provided with suitable valves, of a wrist-lever or frame, a steam-arm, a drop-lever, means for actuating the arm and releasing the lever, a vacuum-pot pivoted to the bonnet of the exhaust-valve, and a connection between the drop-lever and the moving part of the vacuum-pot.

7. In a valve mechanism, the combination, with a cylinder provided with suitable valves and with bonnets for the latter, of a dash-pot mounted upon the bonnet of one of the valves, and a drop-lever connected with the dash-pot and serving to actuate the other valve.

8. In a valve mechanism, the combination, with inlet and exhaust valves and bonnets therefor, of a dash-pot mounted upon the exhaust-valve bonnet and connected with the inlet-valve.

9. In a valve mechanism, the dash-pot comprising two parts m and n, one part m serving to actuate the steam-valve and the other part n being provided with a hub o to fit upon the bonnet Q of the exhaust-valve.

10. In combination with a bonnet Q, cylinder n, provided with hub o to fit upon the bonnet, a plunger m, provided with a rod O, and a drop-lever connected with the rod O and with the steam-valve.

11. In combination with the cylinder n of a dash-pot, a plunger m, provided with a threaded neck x, and a connecting-rod O, provided with a threaded stem w.

12. In combination with valve-stem K, drop-lever N, secured thereto, arm I, mounted on the bonnet and bearing on the bonnet each side of the lever N, and means for releasing the drop-lever.

13. In combination with a valve-stem K and a bonnet J, a drop-lever secured to the stem and projecting out through the side of the bonnet, an arm I, mounted on the bonnet each side of the drop-lever and provided with a slotted or cut-away hub to receive the lever, and means for releasing the lever.

14. In combination with the drop-lever, rocking pin, and cam, an arm I, having its hub i cut away, as at v, so as to force the drop-lever down should its dash-pot fail to act.

15. In combination with the drop-lever, rocking pin, and cam, arm I, provided with an extension a and lugs e, bar or plate c, carried by the pin, and a spring f.

16. In combination with a bonnet having a removable end cap and an opening in one side, a valve-stem supported by the cap, and a drop-lever carried by the stem and projecting through the side of the bonnet.

17. In combination with a bonnet having a lateral opening, a valve-stem, and a drop-lever carried by the stem and projecting through the lateral opening.

18. In combination with a bonnet having an internal bearing $J^2$, a cap-plate $J'$, and a valve-stem supported in the bearing $J^2$ and cap-plate.

19. The combination, with a bonnet having a cap $J'$, of a valve-stem and an adjustable stem carried by the cap-plate to take up the end-thrust on the valve-stem.

20. The circular knock-off plate L, provided with a cam-block $t'$.

21. In combination with the bonnet of a stem-valve, a cap $J'$ and a knock-off plate journaled upon the outer face of the cap, substantially as and for the purpose set forth.

22. In combination with lever I, a knock-off plate L, a drop-lever N, a rocking pin $b$, provided with a bar or plate $c$, and a long spring $f$, having its free end nearer the center of the pin $b$ than is its fixed end.

In witness whereof I hereunto set my hand in the presence of two witnesses.

BRUNO V. NORDBERG.

Witnesses:
W. W. NUGENT,
F. H. KRUEGER.